United States Patent
Tanabe et al.

(10) Patent No.: US 10,149,432 B2
(45) Date of Patent: Dec. 11, 2018

(54) MOWER DRIVEN BY ELECTRIC MOTORS

(71) Applicant: HONDA MOTOR CO., LTD., Tokyo (JP)

(72) Inventors: Shota Tanabe, Wako (JP); Koji Kuriyagawa, Wako (JP); Hajime Yoshimura, Wako (JP); Satoshi Onodera, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 15/443,207

(22) Filed: Feb. 27, 2017

(65) Prior Publication Data

US 2017/0265384 A1 Sep. 21, 2017

(30) Foreign Application Priority Data

Mar. 15, 2016 (JP) .................. 2016050401

(51) Int. Cl.
*A01D 34/66* (2006.01)
*A01D 43/063* (2006.01)
*A01D 69/02* (2006.01)
*A01D 101/00* (2006.01)

(52) U.S. Cl.
CPC ......... *A01D 34/667* (2013.01); *A01D 43/063* (2013.01); *A01D 69/02* (2013.01); *A01D 34/66* (2013.01); *A01D 2101/00* (2013.01)

(58) Field of Classification Search
CPC ...... A01D 34/66; A01D 34/667; A01D 34/71; A01D 43/063; A01D 69/02; A01D 2101/00; A01D 34/01; A01D 34/125; A01D 34/49; A01D 43/06; A01D 43/086; B60K 15/063; B60K 15/067; B60K 15/07; B60K 2015/0634

USPC .................. 56/203, 202; 280/834
See application file for complete search history.

(56) References Cited

U.S. PATENT DOCUMENTS

| | | | |
|---|---|---|---|
| 4,782,650 A | 11/1988 | Walker | |
| 4,899,525 A * | 2/1990 | Takei | A01D 34/64 180/337 |
| 6,431,305 B1 * | 8/2002 | Ishimori | A01D 34/66 180/371 |
| 7,011,182 B2 * | 3/2006 | Iida | B60K 17/105 184/6.12 |

(Continued)

FOREIGN PATENT DOCUMENTS

| JP | H07123834 A | 5/1995 |
|---|---|---|
| JP | 2008263920 A | 11/2008 |

(Continued)

OTHER PUBLICATIONS

Extended European Search Report for Application No. 17160293.1, dated Jun. 7, 2017, 7 pages.

*Primary Examiner* — Robert E Pezzuto
*Assistant Examiner* — Adam J Behrens
(74) *Attorney, Agent, or Firm* — Armstrong Teasdale LLP

(57) ABSTRACT

In a mower (10) driven by a pair of electric motors (15) and using an engine (14) for driving a cutter blade (22), a fuel tank (16) for supplying fuel to the engine is positioned in a space surrounded by the electric motors and a chute (30) for forwarding grass clippings to a grass collection bag (23). The chute extends rearward with an upward slant, and is bent in side view in such a manner that a lower part has a steeper incline than an upper part thereof.

4 Claims, 4 Drawing Sheets

(56) References Cited

U.S. PATENT DOCUMENTS

| | | | | |
|---|---|---|---|---|
| 8,950,167 | B2* | 2/2015 | Moroi | A01D 34/005 56/320.2 |
| 9,725,114 | B1* | 8/2017 | Brown | B62D 11/003 |
| 2005/0126843 | A1* | 6/2005 | Irikura | B60K 7/0015 180/305 |
| 2013/0152538 | A1* | 6/2013 | Fiser | A01D 34/71 56/14.7 |
| 2015/0068182 | A1* | 3/2015 | Decoster | A01D 43/0631 56/202 |
| 2016/0198630 | A1* | 7/2016 | Skoog | A01D 43/063 56/16.6 |

FOREIGN PATENT DOCUMENTS

| | | | |
|---|---|---|---|
| JP | 4189272 B2 | 12/2008 | |
| JP | 2014060940 A | 4/2014 | |
| WO | WO-0191538 A1 * | 12/2001 | ............ A01D 34/64 |
| WO | 2015028954 A1 | 3/2015 | |

\* cited by examiner

MOWER DRIVEN BY ELECTRIC MOTORS

TECHNICAL FIELD

The present invention relates to a mower having wheels that are driven by electric motors.

BACKGROUND ART

Some of the previously proposed mowers are provided with separate power sources for propelling the mower and driving the cutting blade. JP4189272B discloses such a mower.

The mower disclosed in JP4189272B is a riding mower having a blade housing with an open bottom end, a cutting blade positioned in this blade housing and driven by an internal combustion engine, a pair of rear wheels positioned on either side of the rear end of the housing and a pair of hydraulic motors for driving the respective rear wheels. The mower is thus propelled by the hydraulic motors, and the cutting blade for mowing the grass is driven by the internal combustion engine.

A mower is often fitted with a grass collection bag on the rear end of thereof, and a chute extends from the blade housing to the grass collection bag to forward the cut grass clippings to the grass collection bag by using the air flow created by the rotating cutting blade.

The conventional mowers typically used an internal combustion engine for propelling the mower and driving the cutting blade, but there is a growing trend to use electric motors to drive the wheels while the cutting blade is driven by an engine. The electric motors require a battery, and this limits the space available for the fuel tank. Therefore, in a mower using electric motors for propelling the mower and an engine for driving the cutting blade, the positioning of the fuel tank in the mower is highly important for a successful design of the mower.

BRIEF SUMMARY OF THE INVENTION

The present invention was made in view of such problems of the prior art, and has a primary object to create a space for a fuel tank in a mower having a pair of electric motors for driving the wheels, an engine for driving a cutting blade and a chute for forwarding the grass clippings into a grass collection bag.

The present invention achieves such an object by providing a mower (10), comprising: a main body (11); a blade housing (21) depending from the main body and having an open lower end; at least one cutting blade (22) supported in the blade housing in a rotatable manner in a horizontal plane; an engine (14) mounted on the main body for driving the cutting blade; a grass collection bag (23) attached to a rear end of the main body; a chute (30) extending in a fore and aft direction to communicate an interior of the blade housing with an interior of the grass collection bag; a pair of rear wheels (13) provided in a rear part of the main body; a pair of electric motors (15) mounted in a rear part of the main body and connected to the respective rear wheels in a power transmitting relationship; and a fuel tank (16) for supplying fuel to the engine and positioned in a space surrounded by the electric motors and the chute.

Owing to the positioning of the fuel tank in a laterally central part of the main body, the stability of the mower in motion can be improved. The fact that the fuel tank is positioned in a relatively low part of the main body contributes to the lowering of the gravitational center of the main body, and hence the enhancement of the motion stability of the mower. Additionally, positioning of the fuel tank in the rear part of the main body increases the loading of the rear wheels so that the traction of the mower is improved, and the handling of the mower is hence improved.

Furthermore, by maximizing the height of the fuel tank and hence the capacity of the fuel tank, the time period of operating the mower without fuel refueling can be maximized.

According to a preferred embodiment of the present invention, the chute extends rearward with an upward slant, and is bent in side view in such a manner that a lower part thereof has a steeper incline than an upper part thereof or is curved in side view in such a manner that a concave side thereof opposes the fuel tank.

Thereby, the possible height of the fuel tank can be maximized without decreasing the cross sectional area of the chute. Therefore, a relatively large fuel tank can be used while minimizing the chance of clogging the chute with grass clippings.

According to a particularly preferred embodiment of the present invention, the at least one cutting blade includes a pair of cutting blades positioned laterally one next to the other so as to be rotatable in opposite directions, and an inlet end of the chute is connected to a laterally central part of the blade housing.

Thereby, the bending or curving of the chute in plan view can be eliminated or minimized so that the grass clippings can be blown rearward in the chute with a minimum resistance.

BRIEF DESCRIPTION OF THE DRAWING(S)

DESCRIPTION OF THE PREFERRED EMBODIMENT(S)

The directions used in the following description are based on the view of an operator riding the mower.

Figure 1:
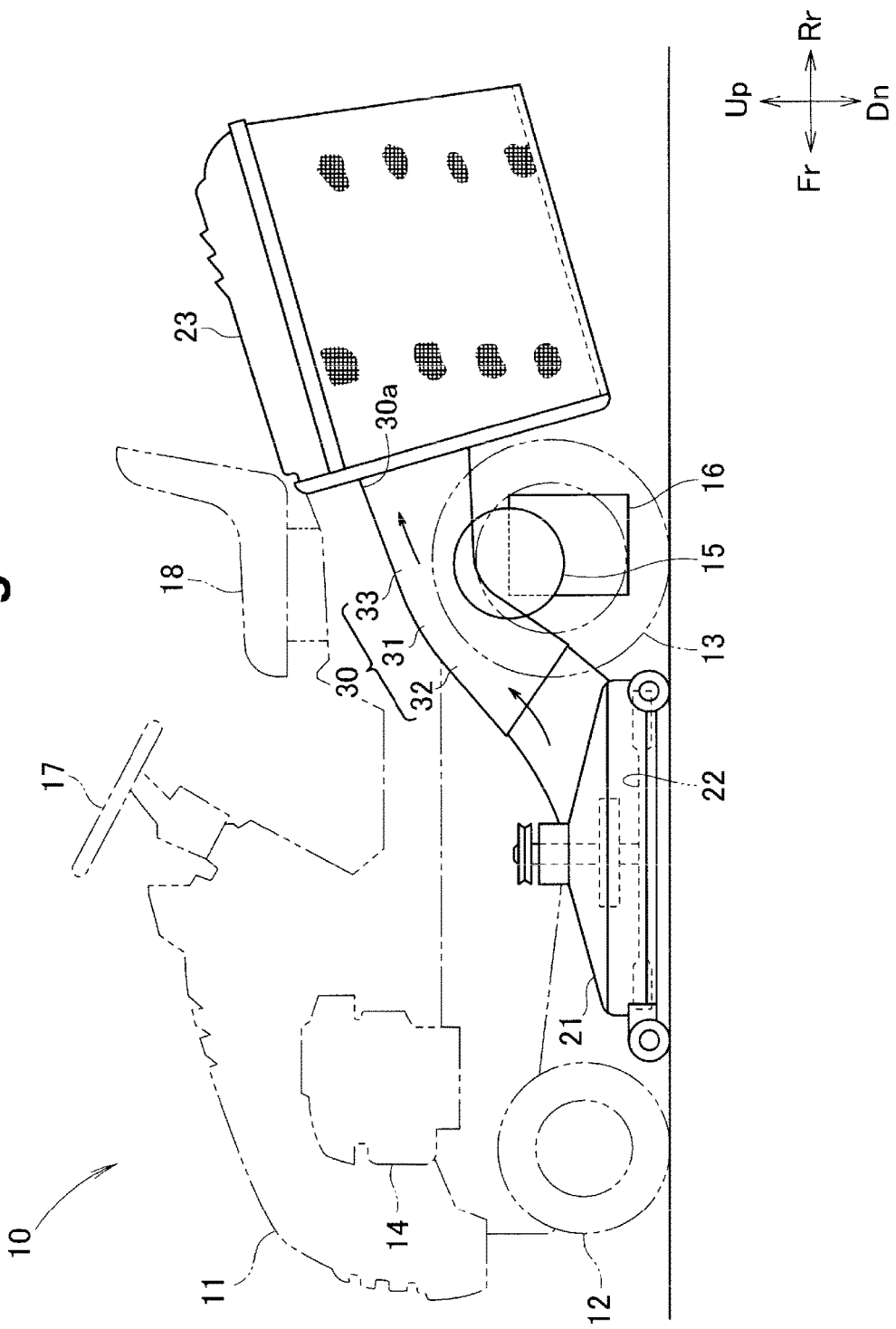
FIG. 1 is a side view of a riding mower embodying the present invention.
Figure 2:
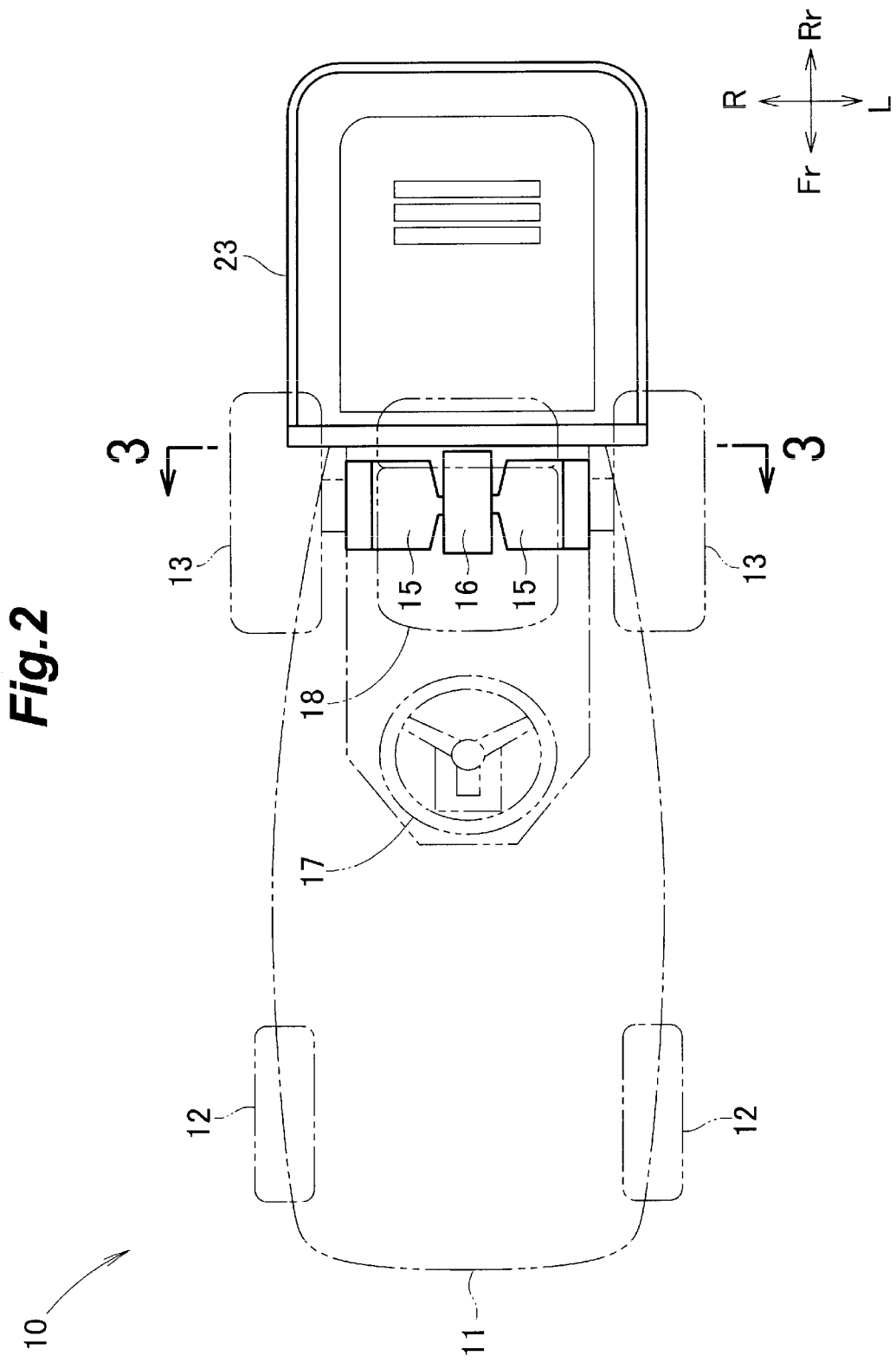
FIG. 2 is a plan view of the mower.

Referring to FIGS. 1 and 2, a lawn mower 10 embodying the present invention is described in the following.

Figure 4A:
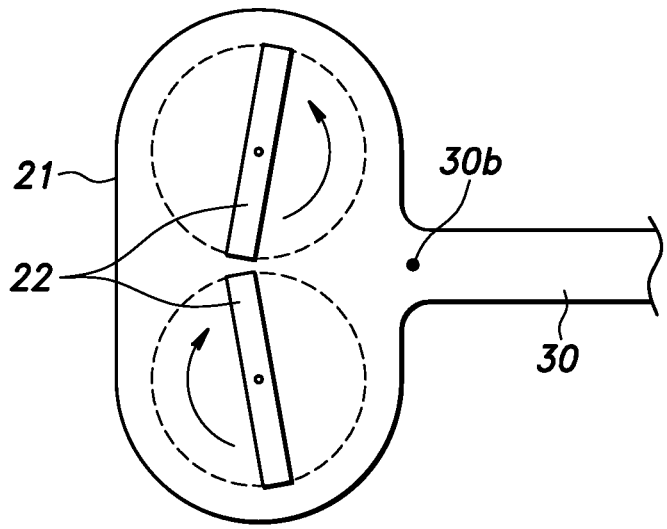
FIGS. 4a and 4b are diagrams illustrating different embodiments of the present invention.

As best illustrated in FIG. 1, this mower 10 includes a main body 11, a pair of front wheels 12 provided in a front part of the main body 11, a pair of rear wheels 13 provided in a rear part of the main body 11, an internal combustion engine 14 mounted on the main body 11 substantially above the front wheels 12, a pair of electric motors 15 mounted on the main body 11 on the inboard side of the respective rear wheels 13, a fuel tank 16 mounted on the main body 11 substantially centrally between the two electric motors 15, a blade housing 21 having an open lower end and depending from a lower part of the main body 11, a pair of cutting blades 22 supported by an upper part of the housing 21 one next to the other on either side so as to be rotatable in a horizontal plane as shown in FIG. 4a, a chute 30 having a front inlet end 30b connected centrally to the rear end of the housing 21 and extending in a fore and aft direction with a prescribed upward slant, a grass collection bag 23 supported by the rear end of the main body 11 and communicating with a rear outlet end 30a of the chute 30, a steering wheel 17 for steering the front wheels 12, and a seat 18 mounted on top of a rear end part of the main body 11 for seating an operator.

Although not shown in the drawings, a battery for supplying electric power to the electric motors 15 may be positioned on a part of the main body 11 located on one side of the seat 18 or in a front part of the main body.

The cutting blades 22 are driven by the engine 14. The cutting blades 22 not only cut the grass but also create a swirling air flow so that the cut grass clippings are forwarded to the grass collection bag 23 via the chute 30. In this case, the two cutting blades 22 are configured to rotate in the opposite directions such that the grass clippings are driven between the two cutting blades 22 tangentially in the rearward direction as shown in FIG. 4a.

In the illustrated embodiment, as shown in FIG. 1, the fuel tank 16 is positioned under the chute 30, and the chute 30 is bent in a middle part 31 thereof corresponding to the position of the fuel tank 16 in side view. In other words, the fuel tank 16 is surrounded by the chute 30 and the electric motors 15. More specifically, the chute 30 has a steeper slant in a lower part 32 thereof than in an upper part 33 thereof. If the chute 30 were connected to the grass collection bag 23 in a straight path, the chute 30 which extends centrally with respect to the width of the main body 11 would interfere with the fuel tank 16. However, owing to the slanting and bending of the chute 30, the chute 30 is prevented from interfering with the fuel tank 16. By bending the chute 30 in a gradual manner, the resistance to the air flow conducted by the chute 30 can be minimized.

Alternatively, the chute 30 may also be curved so as to face the fuel tank 16 with a concave side thereof. In this case also, the chute 30 is prevented from interfering with the fuel tank 16 without substantially increasing the resistance to the air flow conducted by the chute 30.

The engine 14 receives a supply of fuel from the fuel tank 16, and the rear wheels 13 are connected to the respective electric motors 15 in a power transmitting relationship. The steering wheel 17 allows the operator to steer the mower 10 in desired directions via a steering device for the front wheels 12 not shown in the drawings.

Figure 3:
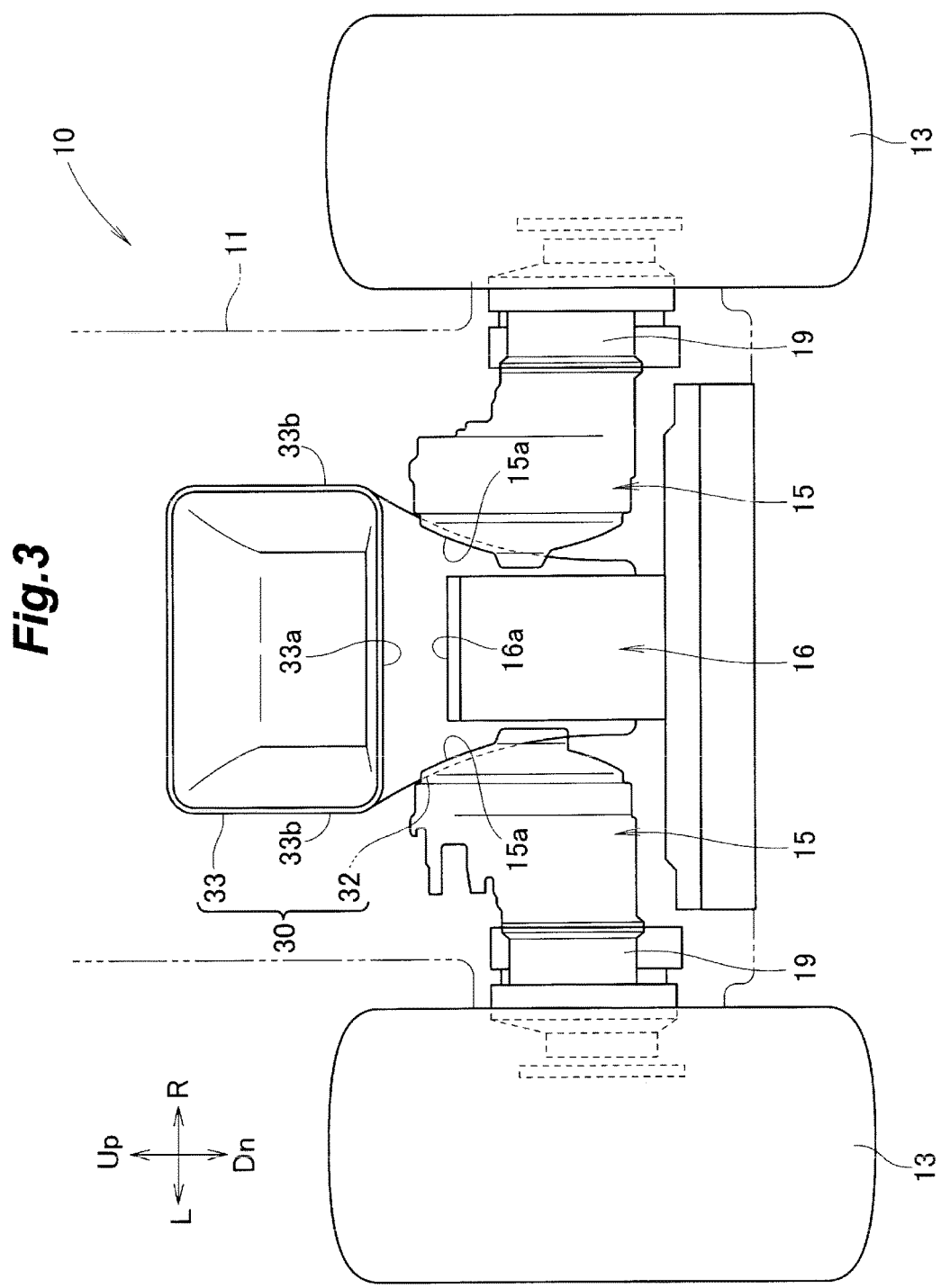
FIG. 3 is a sectional view taken along line 3-3 in FIG. 2.

FIG. 3 is a cross sectional view as seen from behind the mower. Each electric motor 15 is fitted with a reduction gear unit 19, and is jointly attached to the main body 11. The power output of the electric motors 15 is transmitted to the respective rear wheels 13 via the respective reduction gear units 19.

The chute 30 is mainly located centrally of the main body 11 in rear view, and extends above the electric motors 15. The fuel tank 16 is positioned within a space defined by the two electric motors 15 and the chute 30. The lower end of this space is defined by a structural member of the main body 11 not shown in the drawings.

The features and advantages of the illustrated embodiment are discussed in the following.

As shown in FIGS. 1 and 3, in the mower 10 of the illustrated embodiment, the fuel tank 16 is positioned in the space created between the two electric motors 15 for driving the respective rear wheels 13.

The fuel tank 16 is a relatively heavy component of the mower 10, and is positioned centrally with respect to the lateral direction. Furthermore, the fuel tank 16 is positioned in a relatively low part of the main body 11, and this contributes to the lowering the gravitational center of the mower 10. Therefore, the stability of the mower 10 during motion can be enhanced.

Because the fuel tank 16 is positioned between the rear wheels 13, the weight of the fuel tank 16 ensures a favorable traction of the rear wheels 13. This enhances the handling of the mower 10.

Furthermore, by maximizing the height of the fuel tank and hence the capacity of the fuel tank, the time period of operating the mower without fuel refueling can be maximized.

The bending or curving of the chute 30 allows the cross sectional area of the chute 30 to be maximized. As a result, the possibility of grass clippings getting clogged in the chute 30 can be minimized.

In the illustrated embodiment, the chute 30 and the fuel tank 16 are slightly spaced apart from each other. However, it is also possible to have a lower part 33a of the chute 30 contact an upper part 16a of the fuel tank 16. In this case, the fuel tank 16 may be given with the function of supporting the chute 30. If desired, the surfaces by which the fuel tank 16 and the chute 30 abut each other may be made planar or otherwise complementary to each other so that a favorable supporting action may be achieved.

In the illustrated embodiment, the chute 30 is slightly spaced apart from the electric motors 15. However, it is also possible to have a side part 33b of the chute 30 contact a side part 15a of each electric motor 15, or have a lower part of the chute 30 contact an upper part of each electric motor 15. In such cases, the chute 30 is supported either laterally or vertically by the electric motors 15 so that the mechanical stability of the chute 30 may be enhanced.

Figure 4B:
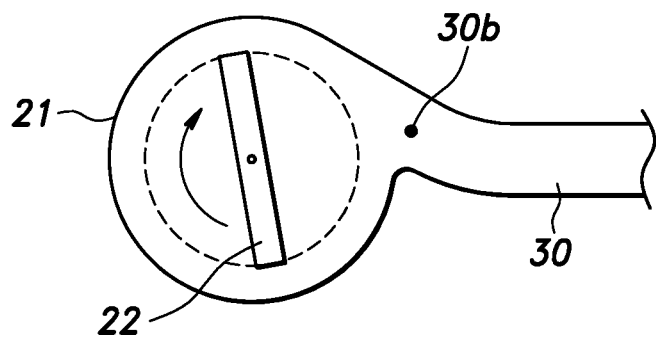

FIG. 4b shows a modified embodiment where the blade housing 21 contains only one cutting blade 22. In this case, the inlet end 30b of the chute 30 extends tangentially from a laterally offset part of the blade housing 21 and is bent or curved toward a laterally central part of the main body 11 so that the main part of the chute 30 (in particular the intermediate and rear parts of the chute 30) extends rearward in a laterally central part of the main body 11.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A mower, comprising:
    a main body;
    a blade housing depending from the main body and having an open lower end;
    at least one cutting blade supported in the blade housing in a rotatable manner in a horizontal plane;
    a pair of front wheels provided in a front part of the main body;
    an internal combustion engine mounted on the main body for driving the cutting blade, the internal combustion engine being positioned directly above the pair of front wheels as seen in side view;
    a grass collection bag attached to a rear end of the main body;
    a chute extending in a fore and aft direction to communicate an interior of the blade housing with an interior of the grass collection bag;
    a pair of rear wheels provided in a rear part of the main body;

a pair of electric motors mounted in a rear part of the main body and connected to the respective rear wheels in a power transmitting relationship; and a fuel tank for supplying fuel to the internal combustion engine and positioned in a space surrounded by the electric motors and the chute.

2. The mower according to claim 1, wherein the chute extends rearward with an upward slant, and is bent in side view in such a manner that a lower part thereof has a steeper incline than an upper part thereof.

3. The mower according to claim 1, wherein the chute extends rearward with an upward slant, and is curved in side view in such a manner that a concave side thereof opposes the fuel tank.

4. The mower according to claim 1, wherein the at least one cutting blade includes a pair of cutting blades positioned laterally one next to the other so as to be rotatable in opposite directions, and an inlet end of the chute is connected to a laterally central part of the blade housing.

* * * * *